(12) United States Patent
Fernandez

(10) Patent No.: US 6,556,514 B2
(45) Date of Patent: Apr. 29, 2003

(54) COMBINATION CLOCK AND ART SET APPARATUS

(75) Inventor: Juan Fernandez, Ridgefield Park, NJ (US)

(73) Assignee: Products of Tomorrow, Inc., Towaco, NJ (US)

( * ) Notice: Subject to any disclaimer, the term of this patent is extended or adjusted under 35 U.S.C. 154(b) by 0 days.

(21) Appl. No.: 09/930,077

(22) Filed: Aug. 15, 2001

(65) Prior Publication Data

US 2003/0035345 A1 Feb. 20, 2003

(51) Int. Cl.$^7$ .................. G04B 19/06; G04B 47/00
(52) U.S. Cl. ................ 368/223; 368/228; 368/10
(58) Field of Search ................ 368/238, 228, 368/232, 223, 10; 224/153

(56) References Cited

U.S. PATENT DOCUMENTS 5,619,478 A * 4/1997 Mutoh .................. 368/223
5,654,940 A * 8/1997 Wei ...................... 368/223

FOREIGN PATENT DOCUMENTS

FR 002678812 A1 * 1/1993 .................. 368/10

* cited by examiner

Primary Examiner—David Martin
Assistant Examiner—Michael L. Lindinger
(74) Attorney, Agent, or Firm—Lerner, David, Littenberg, Krumholz & Mentlik, LLP

(57) ABSTRACT

A combination clock and art set apparatus, including a clock face having a plurality of elements arranged to mark at least one time interval, and clock hands arranged for movement relative to the elements and one another to indicate a time. At least one element or at least one hand includes an artist's implement. In an embodiment, at least one element or at least one hand can be removably secured to the face. In another embodiment, the apparatus includes a pair of adjustable straps that can be used to secure the apparatus to a back of a person.

30 Claims, 4 Drawing Sheets

COMBINATION CLOCK AND ART SET APPARATUS

BACKGROUND OF THE INVENTION

The invention relates to artistic equipment and more particularly to painting sets that can be used as educational tools.

Painting sets are well-known and include paints, painting tools, and painting accessories that are retained and orderly stored in a suitable container. Due to the extended nature of commonly used paintbrushes and other artist's implements, and in the interest of efficiently using available space, many containers are square or rectangular and organize the various stored components in a grid-like fashion. For example, paintbrushes and markers are lined up side by side according to size or characteristic, making it logical to store them in a square or rectangular container.

While such container shapes are efficient for the ordered storage of components, they make the containers difficult to carry unless the containers are very small. Of course, small containers can only carry small and/or a limited number of components. In order to facilitate the carrying of larger containers, the containers are typically fitted with external handles that can be gripped by a person's hand. Unfortunately, carrying such containers in this manner eliminates the ability of the carrier to carry other items at the same time. Especially for children, who routinely visit a school or friends' homes and wish to transport toys, games, and educational tools in additional to the painting set between such places, this can be limiting and frustrating.

Further, while such organizational arrangements enable many painting set components to be stored in a relatively small amount of space, they limit the use of such painting sets for educational purposes beyond the development of artistic abilities. Such containers typically are static containers that have no other functional purposes than to store painting set components and facilitate painting.

Therefore, there is a need for a painting set that can be easily and comfortably transported while freeing the carrier's hands for carrying additional items or accomplishing other tasks.

There is also a need for a painting set that can be used for educational purposes beyond the development of artistic abilities. More particularly, there is a need for a painting set that can be used to teach a person how to use a clock.

SUMMARY OF THE INVENTION

In one embodiment, the invention provides a combination clock and art set apparatus. The apparatus includes a clock face having a plurality of elements arranged to mark at least one time interval, and clock hands arranged for movement relative to the elements and one another to indicate a time. At least one element or at least one hand includes an artist's implement.

In an aspect of this embodiment, the face has twelve elements collectively marking twelve hour-long intervals.

In another aspect of this embodiment, the implement is a paintbrush or a marker.

In yet another aspect of this embodiment, the apparatus includes at least one handle that can be used to carry the apparatus.

In still another aspect of this embodiment, the apparatus includes a pair of adjustable straps that can be used to secure the apparatus to a back of a person.

In still another aspect of this embodiment, at least one element or at least one hand can be removably secured to the face. Preferably in this aspect, the elements can be removably secured to one another. Also preferably in this aspect, the apparatus includes rotateable clock hand holders mounted to the face and into which the hands can be removably secured, one into each holder.

In still another aspect of this embodiment, the apparatus includes a housing with which the face is associated. The housing includes at least one compartment that can contain at least one artist's accessory or implement. Preferably in this aspect, the accessory is a sponge, a stencil, or a source of paint.

In another embodiment, the invention provides a combination clock and art set backpack. The backpack includes a clock body, at least one artist's tool that can be removably secured to the body, and at least one strap that can be used to secure the body to a back of a person.

In an aspect of this embodiment, the tool is a paintbrush or a marker.

In another aspect of this embodiment, the strap comprises a pair of adjustable straps.

In yet another aspect of this embodiment, the body includes at least one compartment that can contain at least one artist's accessory or implement. Preferably in this aspect, the accessory is a sponge, a stencil, or a source of paint.

In still another aspect of this embodiment, the backpack further includes a plurality of elements arranged on the body to mark at least one time interval, and clock hands arranged for movement relative to the elements and one another to indicate a time. At least one element or at least one hand includes the tool. Preferably in this aspect, the body has twelve elements collectively marking twelve hour-long intervals. Also preferably in this aspect, at least one element or at least one hand can be removably secured to the body. Also preferably in this aspect, the elements can be removably secured to one another. Also preferably in this aspect, the backpack further includes rotateable clock hand holders mounted to the body and into which the hands can be removably secured, one into each holder.

In yet another embodiment, the invention provides an apparatus that can be used to teach a person how to use a clock. The apparatus includes a body having a surface and a central axis, a plurality of elements arranged about the central axis on the surface at positions representing at least a portion of the numbers of a clock face, and clock hands mounted to pivot about the central axis so they can be pointed toward at least one of the elements. At least one element or at least one hand includes an artist's tool.

In an aspect of this embodiment, the plurality of elements comprises twelve elements collectively marking twelve hour-long intervals.

In another aspect of this embodiment, the tool is a paintbrush or a marker.

In yet another aspect of this embodiment, the apparatus includes at least one handle that can be used to carry the apparatus.

In still another aspect of this embodiment, the apparatus includes a pair of adjustable straps that can be used to secure the apparatus to a back of a person.

In still another aspect of this embodiment, at least one element or at least one hand can be removably secured to the surface. Preferably in this aspect, the elements can be removably secured to one another. Also preferably in this aspect, the apparatus includes rotateable clock hand holders mounted to the surface and into which the hands can be removably secured, one into each holder.

In still another aspect of this embodiment, the body comprises at least one compartment that can contain at least one artist's accessory or tool. Preferably in this aspect, the accessory is a sponge, a stencil, or a source of paint.

In yet a further aspect of this present invention, an art set includes artists' implements in a case designed to provide education in the interaction of artists' implements and the case or a portion thereof.

DETAILED DESCRIPTION

Figure 1:
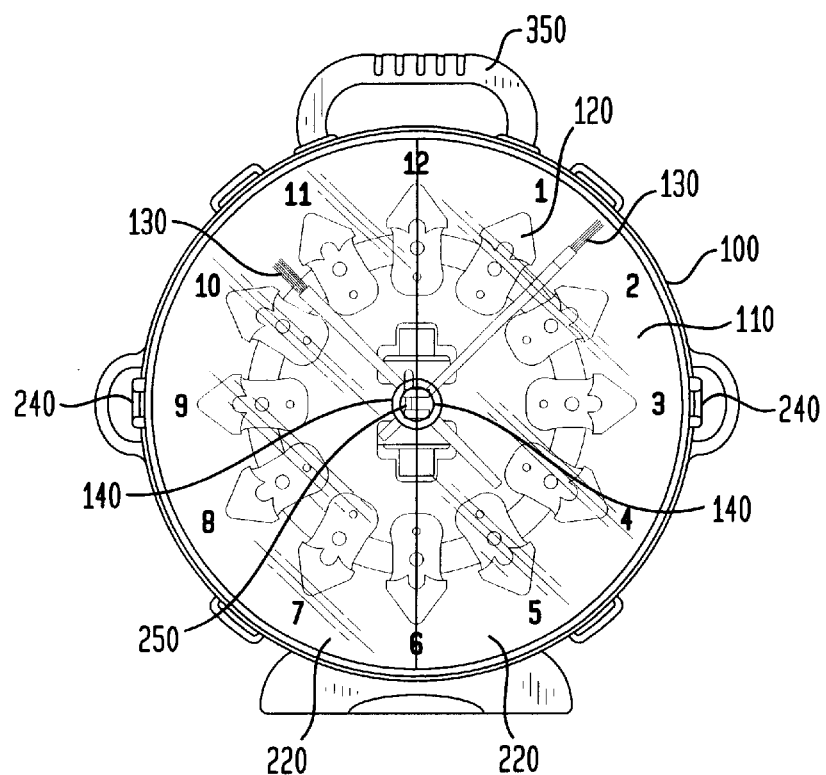
FIG. 1 is front elevation view of an embodiment of the invention.
Figure 2:
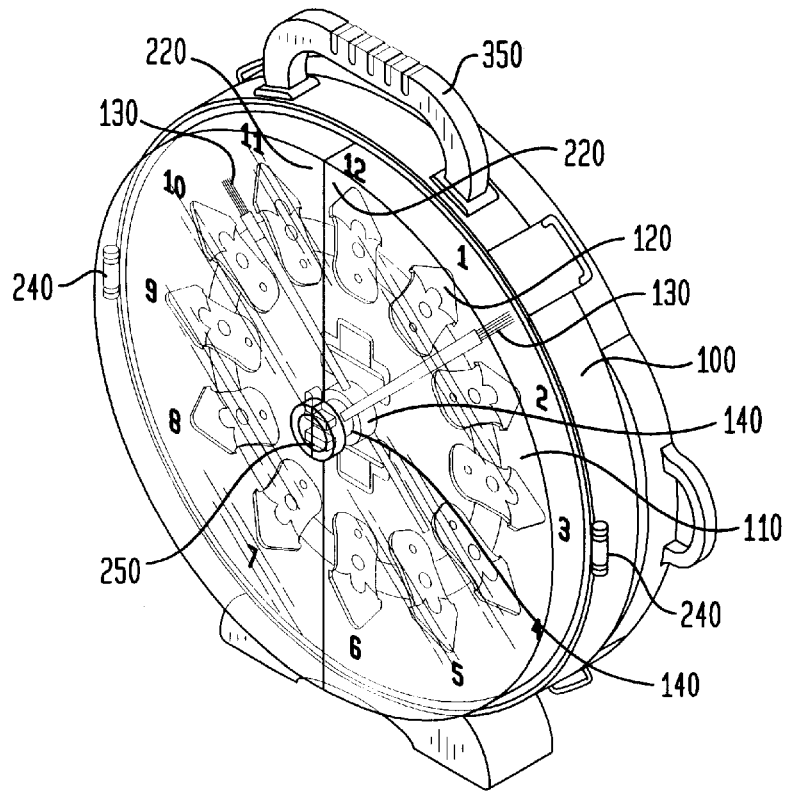
FIG. 2 is a front perspective view of the embodiment of FIG. 1.

FIGS. 1–7 illustrate an embodiment of the invention. Like numbers refer to like elements throughout. The illustrated apparatus includes a clock body 100 having a central axis and a surface 110 serving as a clock face. The clock face 110 has a plurality of elements 120 arranged about the central axis at positions representing at least a portion of the numbers of a clock face, to mark at least one time interval. Preferably, the illustrated apparatus has twelve elements 120 collectively marking twelve hour-long intervals. It should be understood that in other embodiments, there may be fewer elements or only one element and/or the element(s) may collectively mark intervals of other lengths of time and/or the element(s) may collectively mark a different number of intervals.

The illustrated apparatus further includes two clock hands 130 arranged for movement relative to the elements 120 and one another. The clock hands 130 are mounted about the central axis so they can be pointed toward at least one of the elements 120 to indicate a time. More particularly, rotateable clock hand holders 140 are mounted to the clock face 110. Each holder 140 is adapted to hold one of the clock hands 130, as further explained below.

At least one of the elements 120 or at least one of the hands 130 includes an artist's implement. Exemplary implements include a marker, a paintbrush, a pen, a pencil, a charcoal stick, a chalk stick, and a glue stick. In the illustrated apparatus, each element 110 is a marker and each hand 120 is a paintbrush.

At least one of the elements or at least one of the hands can be removably secured to the clock face. Especially for those elements and/or hands that are an artist's implement, this feature facilitates use and transport of the implement. For example, each implement can be secured to the clock face for transport and for use in instructing a person in the use of a clock (as described in greater detail below), and can be removed from the clock face so that the implement can be used to create a work of art (as described in greater detail below).

Figure 3:
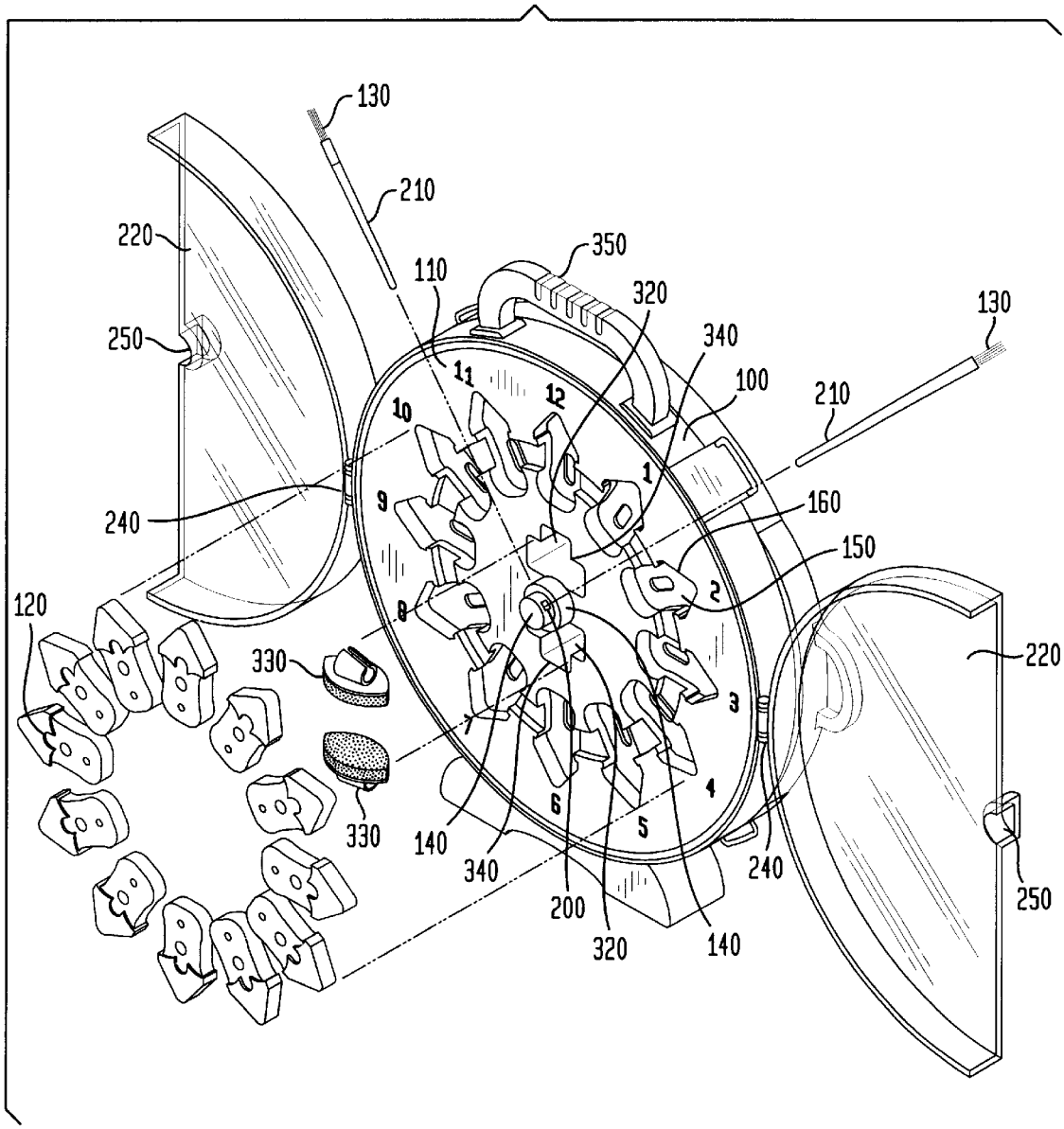
FIG. 3 is a front perspective view of the embodiment of FIG. 1 illustrating a removal of components.

In this embodiment, each element 120 can be removably secured to the clock face 110 at its respective position. While any suitable securing method or device can be used, in this embodiment each element position on the clock face 110 is formed with a recess 150 having an opening 160 that expands when the element 120 is forced therethrough, and relaxes after the element 120 has passed therethrough. These features are best shown in FIG. 3. The recess 150 accommodates the dimensions of the element 120, and the opening 160 in a relaxed state prevents the element 120 from escaping unless the element 120 is pulled through the opening 160 with a force great enough to expand the opening 160. It should be understood that in some embodiments, less than all of the elements include an artist's implement and/or less than all of the elements can be removably secured to the clock face. For example, in some embodiments, elements that are not artist's implements can be permanently secured to the clock face for convenience or other reasons.

Figure 6A:
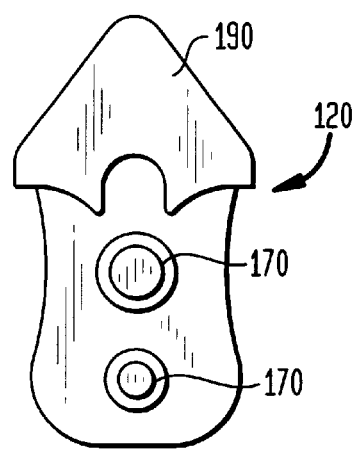
FIGS. 6A and 6B are back and front perspective views of an element of the embodiment of FIG. 1 with a closed cap.
Figure 6B:
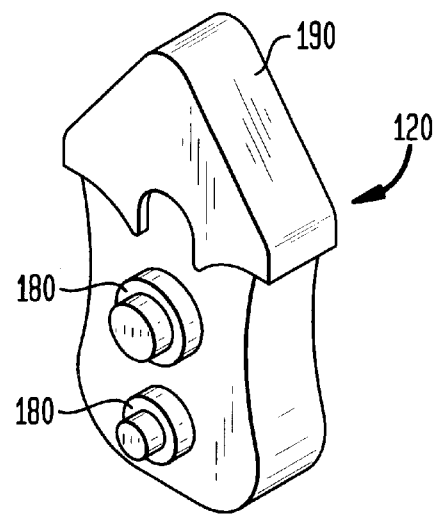
Figure 7A:
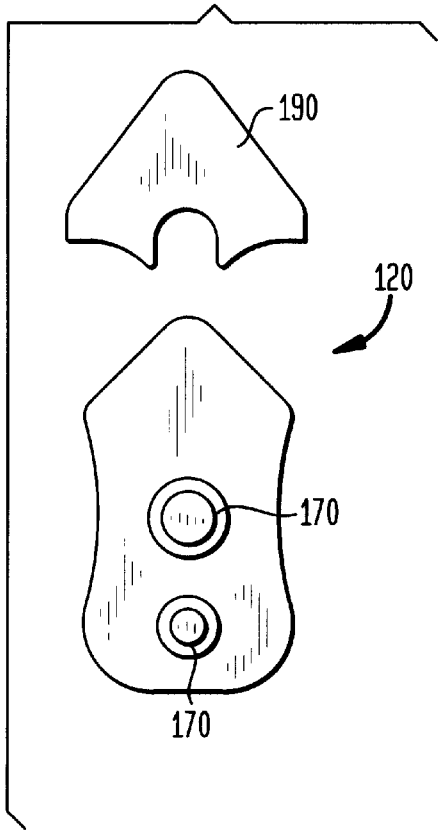
FIGS. 7A and 7B are back and front perspective views of the element of FIG. 6 with a removed cap.
Figure 7B:
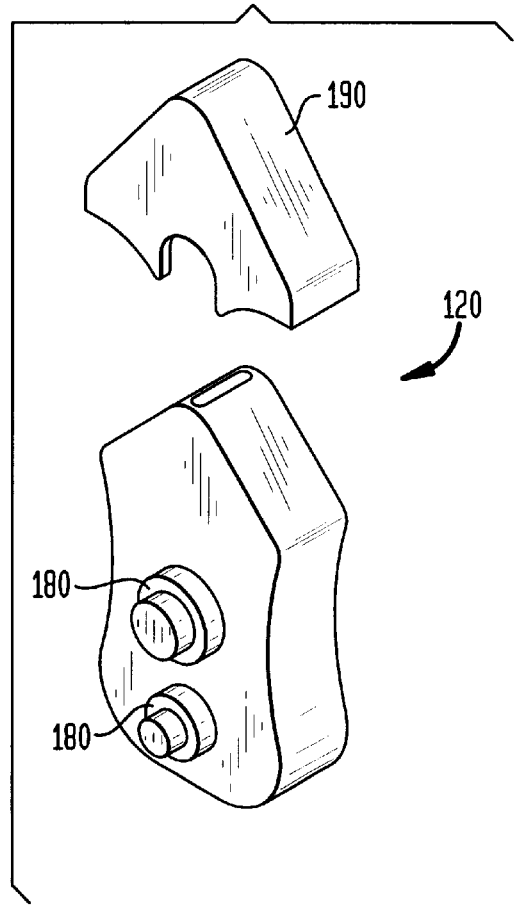

Further in this embodiment, at least one element 120 can be removably secured to at least one other element 120. More specifically, as best shown in FIGS. 6 and 7, at least two elements 120 each include cooperating parts of an attachment device, at least one receptacle part 170 on one side of the element and at least one protrusion part 180 on another side of the element. Therefore, the receptacle part 170 of the one element can be filled with the protrusion part 180 of the other element. An interference fit between the protrusion 180 and receptacle 170 parts securely maintains the elements 120 during use, and allows release when done. Further, when more than two of the elements 120 have such a receptacle and a protrusion, these more than two of the elements 120 can be secured together sequentially in this manner. When these two or more of the elements are artists' implements, they can be placed against a canvass to create parallel markings. The elements in this embodiment are shown as markers having a cap 190 to prevent drying of the ink and to prevent accidental marking during non-use.

Further in this embodiment, the clock hands 130 can be removably secured into the holders 140 (one hand into each holder). While any suitable securing method or device can be used, in this embodiment each holder 140 has a bore 200 that is dimensioned so that when either one of the proximal ends 210 of the hands 130 is pushed into the bore 200, the end 210 is compression locked within the bore 200. A force overcoming the compression force can be applied to pull the end 210 from the bore 200 when the hand 130 is to be removed from the holder 140. The bores 200 in the clock hand holders 140 preferably differ in size so that the clock hands 130 are held with their ends at different radial locations, thereby resulting in an hour hand and a minute hand. Alternatively, the clock hands 130 could differ in size so that they fit into the clock hand holders 140 in such ways as to be recognized as hour and minute hands. It should be understood that in some embodiments, there may be less than or more than two clock hands. It should also be understood that in some embodiments, less than all of the clock hands include an artist's implement and/or less than all of the clock hands can be removably secured to the clock face. For example, in some embodiments, one or more clock hands are permanently secured to the clock face for convenience or other reasons.

The illustrated apparatus can be used to store and/or transport one or more artists' accessories and/or additional artists' implements. It should be evident that the artists' implements that are elements or hands and/or that can be removably secured to the clock face can be stored in their respective places on the clock face as described above, and when so secured, can be transported along with the apparatus.

To help ensure that the artists' implements that are elements or hands and/or that can be removably secured to the clock face are not displaced from the apparatus during transport, and for other reasons, the apparatus includes at least one door that can be opened and closed about the clock face. An open position of the door provides access to the clock face, the elements, and the clock hands. A closed position of the door covers the clock face, the elements, and the clock hands, preventing the elements and the clock hands from escaping the apparatus if they are dislodged from their respective places on the clock face. In this embodiment, there are two doors 220 hinged about opposing tangent points 240 at the edge of the clock face 110. A latch 250 is provided that can be opened to permit the doors 220 to be placed in an open position (see FIG. 3), and closed to secure the doors 220 in a closed position (see FIG. 2). It should be understood that other embodiments may include only one door, or more than two doors, and the door(s) may function to cover only one or more elements, or only one or more clock hands, or no elements or clock hands. In some embodiments, the door(s) may have only an aesthetic function and/or may have one or more other functions. There may also be no doors at all, or a closure or lid that differs from a door.

Figure 5:
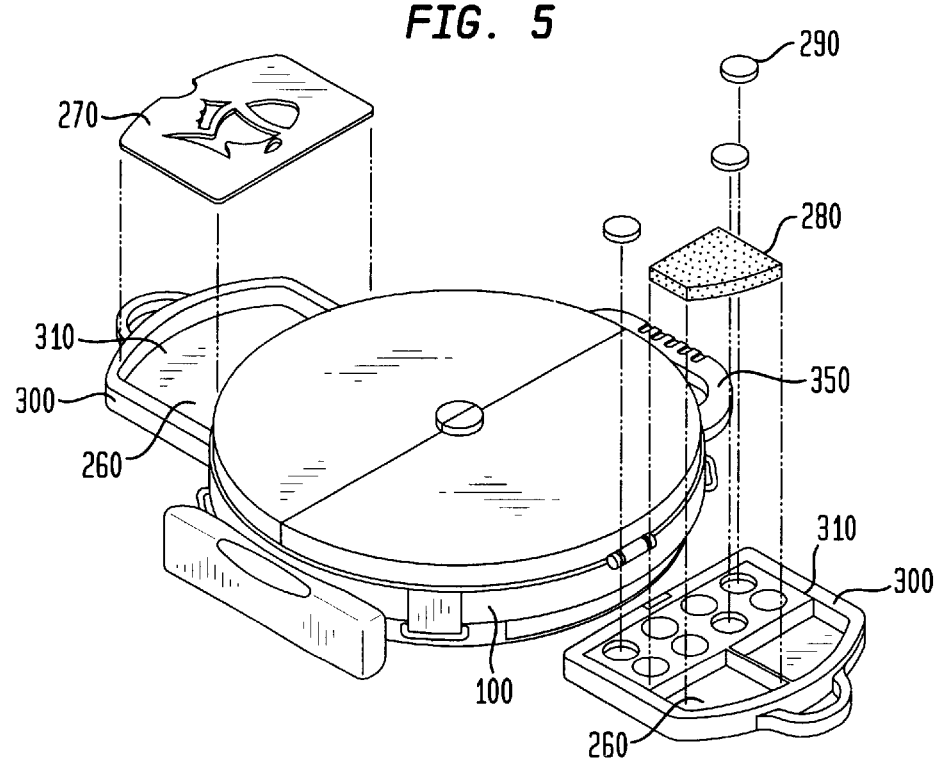
FIG. 5 is a perspective view of the embodiment of FIG. 1 illustrating a storage of components.

Further with regard to storing and transporting one or more artists' accessories and/or additional artists' implements, the illustrated clock body 100 forms a housing with which the clock face 110 is associated. This housing includes at least one compartment that can contain at least one artist's accessory or implement. Exemplary implements include a marker, a paintbrush, a pen, a pencil, a charcoal stick, a chalk stick, and a glue stick. Exemplary accessories include a sponge, a stencil, or a source of paint. In this embodiment, as best shown in FIG. 5, the housing 100 includes two compartments 260. These compartments 260 are shown as containing a stencil 270, a sponge 280 and paint cups 290. Drawers 300 forming the compartments 260 can be slid relative to the housing 100 to expose openings 310 through which the accessories 270, 280, 290 can be passed to place them into and remove them from the compartments 260.

The housing 100 can include one or more additional features that can be used to store and/or transport one or more artists' accessories and/or additional artists' implements. Two additional features are shown in this embodiment in FIG. 3 as two recesses 320 in the surface 110 that each accommodate a sponge tool 330. Each sponge tool 330 can be removably secured to the housing 100 in that each recess 320 has an opening 340 that functions similarly to the openings 160 of the element position recesses 150 described above. It should be understood that other features can be used to store and/or transport these and other artists' accessories and/or additional artists' implements, and that such features can have suitable functionalities similar to or different from those described herein.

The illustrated apparatus includes features that can be used to transport the apparatus. In this embodiment, the housing 100 includes a handle 350 that can be used to carry the apparatus. The handle 350 is formed to be integral with the housing 100. It should be understood that in other embodiments, there may be more than one handle, and/or any handle can be secured to the housing rather than be integral with the housing.

Figure 4:
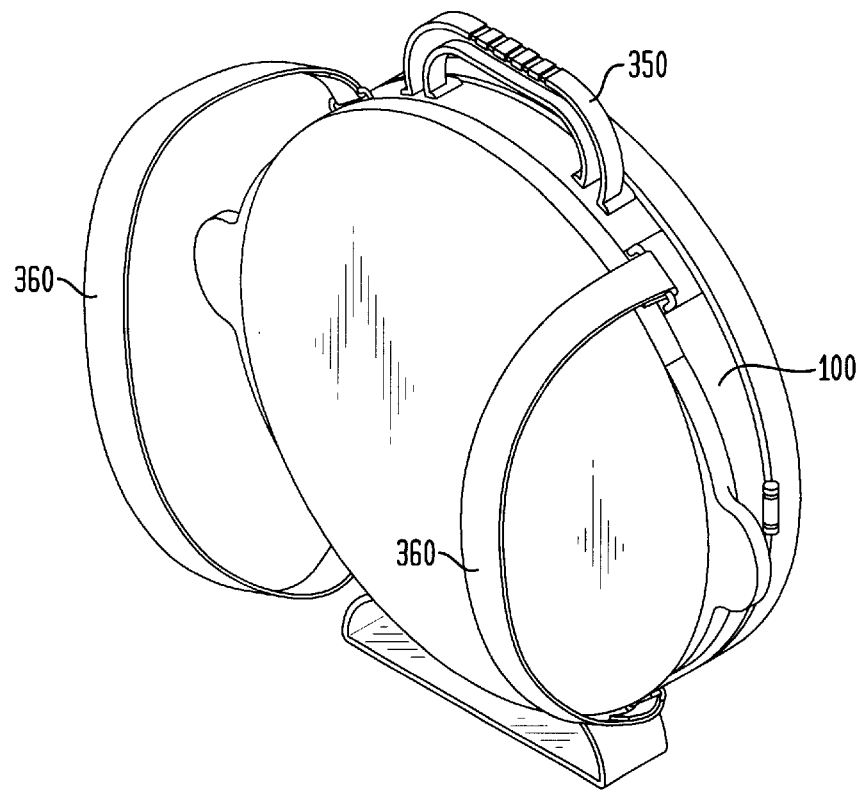
FIG. 4 is a rear perspective view of the embodiment of FIG. 1 showing adjustable straps.

Further with regard to features that can be used to transport the apparatus, the illustrated apparatus includes a pair of straps 360 that can be used to secure the apparatus to a back of a person. Preferably, as best shown in FIG. 4, the straps are adjustable so that they can accommodate a variety of persons. It should be understood that in other embodiments, there may be only one strap, or more than two straps, and/or one or more or the straps can be non-adjustable. Accordingly, the invention in this embodiment provides a combination clock and art set backpack. More specifically, the backpack includes the clock body 100, at least one artist's tool 120, 130 that can be removably secured to the body 100, and at least one strap 360 that can be used to secure the body 100 to a back of a person.

The apparatus can be used to teach a person, whether a child or an adult, how to use a clock. As noted above, the elements 120 are arranged on the surface 100 at positions representing at least a portion of the numbers of a clock face, and the clock hands 130 are mounted to pivot on the surface 100 so they can be pointed toward at least one of the elements 120. Therefore, a person can be shown that, for example, when a longer of the clock hands 130 is pointed toward the element representing the "12" on a clock face, and a shorter of the clock hands 130 is pointed toward the element representing the "3" on a clock face, the apparatus indicates that the time is 3 o'clock. It should be understood that the clock hands 130 can be rotated to point toward other combinations of elements 120 to indicate other times. Therefore, the person being taught can be quizzed regarding the indicated time, and/or instructed to rotate the hands himself or herself to reflect a time that his or her teacher has stated. It should also be understood that other indications can be used to distinguish the "big" or hour hand from the "small" or minute hand, such as, for example, using hands of different colors, sizes and/or shapes. It should be understood that in some embodiments, the apparatus may be adapted with mechanical parts and/or one or more power sources that will move the clock hands automatically, preferably in a manner causing the apparatus to be useful for telling the time of day.

The apparatus can also be used to prepare works of art. In embodiments where one or more elements can be removed from the clock face and are artists' implements, the elements can be used to prepare a work of art. In the illustrated embodiment, the elements 120 are markers that can be removed from the clock face 110. Preferably, each marker has a unique color, and therefore the markers can be used to create multi-colored pictures or other works of art. It should be understood that in some embodiments, two or more markers may be the same color.

Similarly, in embodiments where one or more clock hands can be removed from the clock face and are artists' implements, the clock hands can be used to prepare a work of art. In the illustrated embodiment, the clock hands 130 are paint brushes that can be removed from the clock hand holders 140. The brushes have identical brush density and texture. It should be understood that in some embodiments, the brushes may have different densities and/or textures. The brushes can be used in conjunction with sources of paint to remove paint from the sources and apply the paint to a canvass to create a work of art.

The artist's accessories 270, 280, 290 in the compartments 260 can be used in conjunction with the artist's implements 120, 130 to create a work of art. The paint cups 290 can serve as sources of paint for use with the brushes 130, and the stencils 270 can be used with the brushes 130 to paint stenciled shapes onto a canvass. The stencils 270 can also be used with the markers 120 to mark stenciled shapes onto a canvass. The sponge 280 can be used to wash the brushes 130 and/or remove paint from a canvass. When the accessories 270, 280, 290 are not being used and/or it is desirable to transport them, they can be contained in the compartments 260 and can be carried with the housing 100 using the handle 350 and/or the straps 360.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A combination clock and art set apparatus, comprising a clock face having a plurality of elements arranged to mark at least one time interval; and clock hands arranged for movement relative to the elements and one another to indicate a time; wherein at least one element or at least one hand comprises an artist's implement.

2. The apparatus of claim 1, wherein the face has twelve elements collectively marking twelve hour-long intervals.

3. The apparatus of claim 1, wherein the implement is a paintbrush or a marker.

4. The apparatus of claim 1, further comprising at least one handle that can be used to carry the apparatus.

5. The apparatus of claim 1, further comprising a pair of adjustable straps that can be used to secure the apparatus to a back of a person.

6. The apparatus of claim 1, wherein at least one element or at least one hand can be removably secured to the face.

7. The apparatus of claim 6, wherein the elements can be removably secured to one another.

8. The apparatus of claim 6, further comprising rotateable clock hand holders mounted to the face and into which the hands can be removably secured, one into each holder.

9. The apparatus of claim 1, further comprising a housing with which the face is associated, said housing including at least one compartment that can contain at least one artist's accessory or implement.

10. The apparatus of claim 9, wherein the accessory is a sponge, a stencil, or a source of paint.

11. A combination clock and art set backpack, comprising a clock body; at least one artist's tool that can be removably secured to the body; and at least one strap that can be used to secure the body to a back of a person.

12. The backpack of claim 11, wherein the tool is a paintbrush or a marker.

13. The backpack of claim 11, wherein the strap comprises a pair of adjustable straps.

14. The backpack of claim 11, wherein the body comprises at least one compartment that can contain at least one artist's accessory or implement.

15. The backpack of claim 14, wherein the accessory is a sponge, a stencil, or a source of paint.

16. The backpack of claim 11, further comprising a plurality of elements arranged on the body to mark at least one time interval; and clock hands arranged for movement relative to the elements and one another to indicate a time; wherein at least one element or at least one hand comprises the tool.

17. The backpack of claim 16, wherein the body has twelve elements collectively marking twelve hour-long intervals.

18. The backpack of claim 16, wherein at least one element or at least one hand can be removably secured to the body.

19. The backpack of claim 18, wherein the elements can be removably secured to one another.

20. The backpack of claim 18, further comprising rotateable clock hand holders mounted to the body and into which the hands can be removably secured, one into each holder.

21. An apparatus that can be used to teach a person how to use a clock, comprising a body having a surface and a central axis; a plurality of elements arranged about the central axis on the surface at positions representing at least a portion of the numbers of a clock face; and clock hands mounted to pivot about the central axis so they can be pointed toward at least one of the elements; wherein at least one element or at least one hand comprises an artist's tool.

22. The apparatus of claim 21, wherein the plurality of elements comprises twelve elements collectively marking twelve hour-long intervals.

23. The apparatus of claim 21, wherein the tool is a paintbrush or a marker.

24. The apparatus of claim 21, further comprising at least one handle that can be used to carry the apparatus.

25. The apparatus of claim 21, further comprising a pair of adjustable straps that can be used to secure the apparatus to a back of a person.

26. The apparatus of claim 21, wherein at least one element or at least one hand can be removably secured to the surface.

27. The apparatus of claim 26, wherein the elements can be removably secured to one another.

28. The apparatus of claim 26, further comprising rotateable clock hand holders mounted to the surface and into which the hands can be removably secured, one into each holder.

29. The apparatus of claim 21, wherein the body comprises at least one compartment that can contain at least one artist's accessory or tool.

30. The apparatus of claim 29, wherein the accessory is a sponge, a stencil, or a source of paint.

* * * * *